United States Patent [19]

Wozny et al.

[11] 4,297,989

[45] Nov. 3, 1981

[54] SOLAR HEAT COLLECTOR

[76] Inventors: Philip A. Wozny, 405 Shepherd Ave., Cambridge, Md. 21613; Jerome L. Wozny, 6174 Elm St., Omaha, Nebr. 68106

[21] Appl. No.: 111,114

[22] Filed: Apr. 17, 1980

Related U.S. Application Data

[63] Continuation-in-part of Ser. No. 88,341, Oct. 26, 1979, abandoned.

[51] Int. Cl.³ .............................................. F24J 3/02
[52] U.S. Cl. .................................. 126/441; 126/432; 126/449
[58] Field of Search ............... 126/432, 449, 428, 444, 126/442, 446, 447, 441

[56] References Cited

U.S. PATENT DOCUMENTS

| Re. 30,136 | 11/1979 | Schriefer | 126/449 |
| 2,888,007 | 5/1959 | Tabor | 126/441 |
| 3,875,925 | 4/1975 | Johnston | 126/435 |
| 4,099,338 | 7/1978 | Mullin et al. | 126/428 |
| 4,137,899 | 2/1979 | Weslow | 126/441 |
| 4,154,224 | 5/1979 | Ferriera | 126/446 |
| 4,210,129 | 7/1980 | O'Hanlon | 126/447 |
| 4,232,658 | 11/1980 | Gessford | 126/449 |

Primary Examiner—Carroll B. Dority, Jr.
Attorney, Agent, or Firm—William D. West

[57] ABSTRACT

An improved solar collector having a screen, positioned between the light admitting layer and the energy absorbing layer, for increased energy retention is disclosed. A forced air heat transfer means which is adaptable to modular construction is also disclosed.

5 Claims, 13 Drawing Figures

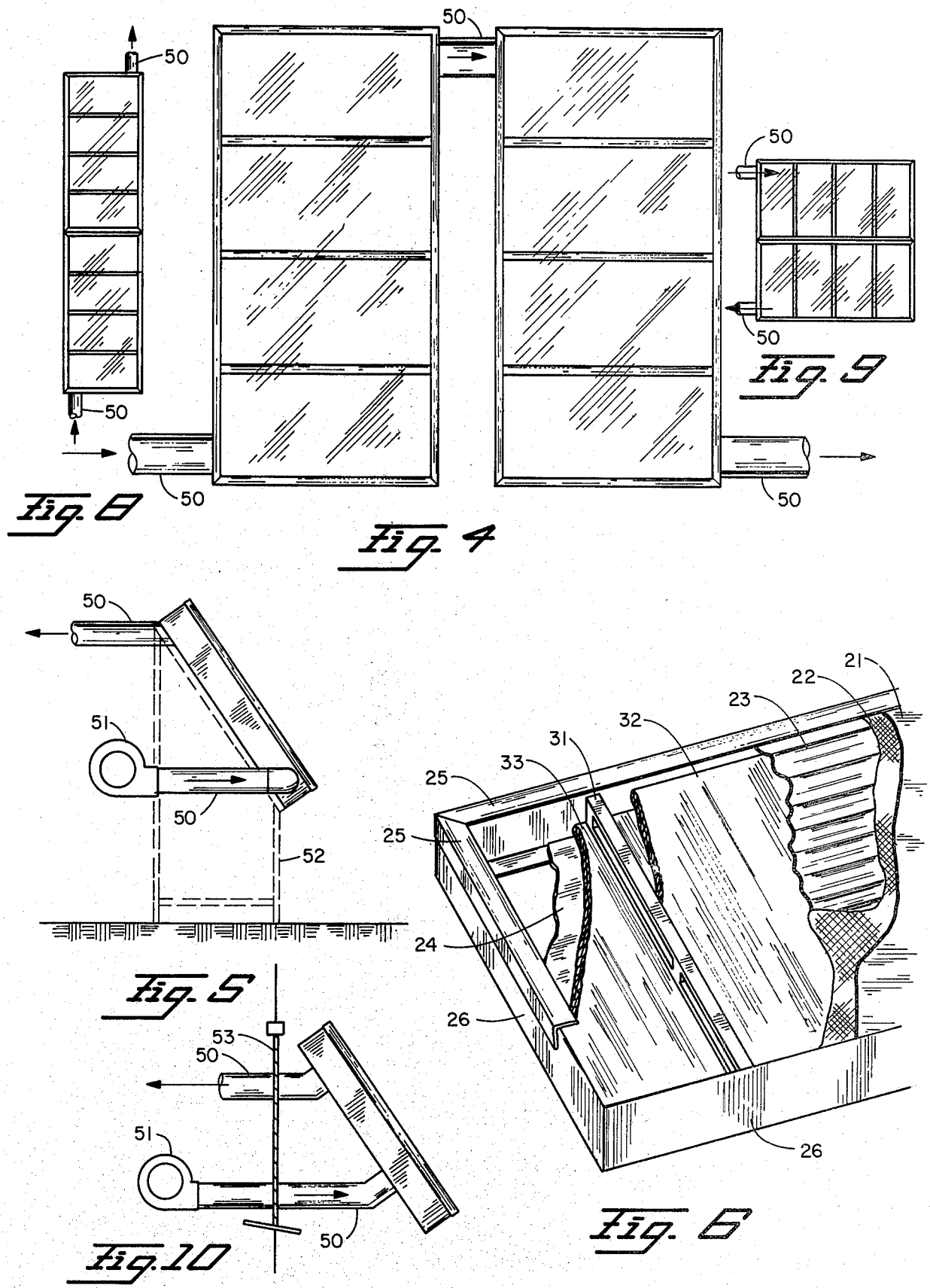

SOLAR HEAT COLLECTOR

RELATED APPLICATION

This application is a continuation-in-part of our copending application Ser. No. 088,341, filed Oct. 26, 1979, now abandoned.

BACKGROUND OF THE INVENTION

The use of solar energy for heating buildings or other enclosures has been known for centuries. A glass window and a living room rug can act as a solar heat collector. A green house and an outdoor swimming pool are other examples of solar heat collectors. The basic elements necessary for solar heat collection are an energy absorbing body within an enclosed area and a light admitting medium which allows solar radiation to enter the enclosed area and strike the energy absorbing body without allowing heat radiation to escape from the enclosed area. Nearly any nonreflective object will act as an energy absorber and any transparent or translucent object such as a plate of glass or a body of water will allow light to pass and will retain heat. The focus of solar heat collective inventions in recent years has been on improving the efficiency of these basic solar heat collection elements and in adapting solar heat collectors to conventional heating uses.

Lof, U.S. Pat. No. 2,680,565, discloses a solar heating system using a series of transparent and reflective plates with blackened lower surfaces. The glass plates are mounted on a roof and are protected from hail by a wire screen positioned above the plates. Air between the plates is in fluid communication with the conventional forced air heating system in the house.

Thomason, U.S. Pat. No. 3,369.539, discloses a solar heat collector located on an inclined surface wherein a mesh material is located inside a granular absorber material to prevent the granular material from creeping down the inclined surface.

Keyes, et. al., U.S. Pat. No. 3,946,720, discloses a solar heat collector in which a conditioning air flow is directed over a quantity of heat retaining material positioned within a baffle arrangement located beneath the glass face of the collector.

Loth, U.S. Pat. No. 4,154,220, discloses a solar heat collector enclosed within a rectangular box shaped housing. Conditioning air introduced at one end of the box is passed over a corrugated foam absorber and discharged from the opposite end of the box.

Lof, U.S. Pat. No. 4,072,142, discloses a solar heat collector which employs a corrugated screen located in an air gap beneath the absorber plate to increase the heat absorption of the conditioning air which is forced through the air gap.

Although the art discloses a number of different solar heat collectors adapted for residential heating, the basic functional elements of the heat collector remain unchanged. A problem in the efficiency of these devices has been that a substantial amount of light is reflected by the absorber and lost through the transparent medium. A means for redirecting this reflected light back to the absorber surface would improve the efficiency of any heat collector. Other problems with solar heat collectors have been their bulkiness and high cost.

SUMMARY OF THE INVENTION

The solar heat collector of the present invention is a lightweight, efficient, and inexpensive device as compared with other solar heat collectors presently available. A unique feature of the present invention is the use of a screen located between the light admitting layer and the energy absorbing layer to increase energy retention.

Accordingly, a primary object of the invention is to provide a solar heat collector with an energy retaining screen positioned between the light admitting layer and the energy absorbing layer.

A further object of the invention is to provide a solar heat collector using plenum chambers in connection with a forced air means.

A further object of the invention is to provide a solar heat collector that is easily adaptable to modular connection.

A further object of the invention is to provide a solar heat collector with a lightweight construction which may be placed on a roof without additional support structure.

A further object of the invention is to provide a solar heat collector with a plastic face for admitting solar radiation.

A further object of the invention is to provide a solar heat collector with a low production cost.

A further object of the invention is to provide a solar heat collector which may be used in low income housing to reduce heating costs.

A further object of the invention is to provide a solar heat collector which may be interconnected with the existing heating systems in buildings.

A further object of the invention is to provide a solar heat collector which may be used with any fluid heat transfer medium.

A further object of the invention is to provide a solar heat collector having a screen imbedded in the light admitting layer.

A further object of the invention is to provide a solar heat collector having a transparent face for admitting solar radiation and a screen for increasing the efficiency of the collector.

A further object of the invention is to provide a solar heat collector which may be used in connection with an energy storing device.

BRIEF DESCRIPTION OF THE DRAWINGS

FIG. 4 is a plan view of one configuration of interconnected solar heat collectors.

FIG. 5 is an elevation view of a solar heat collector mounted on a support stand.

FIG. 6 is a cutaway perspective view of a solar heat collector.

FIG. 8 is a plan view of another configuration of interconnected solar heat collectors.

FIG. 9 is a plan view of still another configuration of interconnected solar heat collectors.

FIG. 10 is an elevation view of a solar heat collector mounted on a window.

DESCRIPTION OF THE PREFERRED EMBODIMENTS

Figure 1:
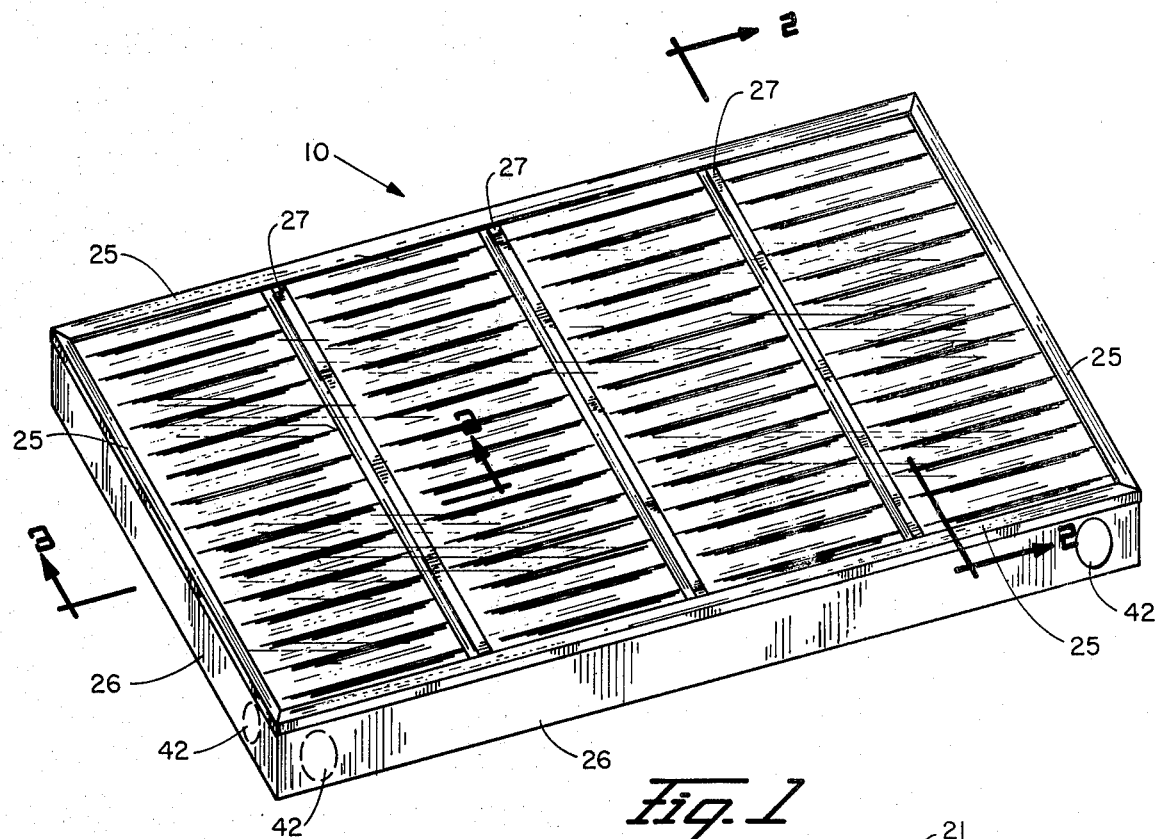
FIG. 1 is a perspective view of a solar heat collector.

In the preferred embodiment shown in FIG. 1, the solar heat collector 10 has a rectangular box-like shape. One of the faces of largest surface area in the box is formed by a single transparent plate hereinafter referred to as the solar panel 21. For purpose of reference, the face of the box containing the solar panel will be referred to as the upper face of the box. The face of the box parallel to the upper face will be referred to as the lower face of the box. The remaining faces of the box will be referred to collectively as the lateral faces of the box; the larger lateral faces will be referred to as side faces, and the smaller lateral faces will be referred to as end faces.

As may be seen in FIGS. 2 and 6, a screen 22 is positioned immediately below the solar panel 21. The walls 26 of the solar collector 10 are constructed of sheet metal.

Figure 2:
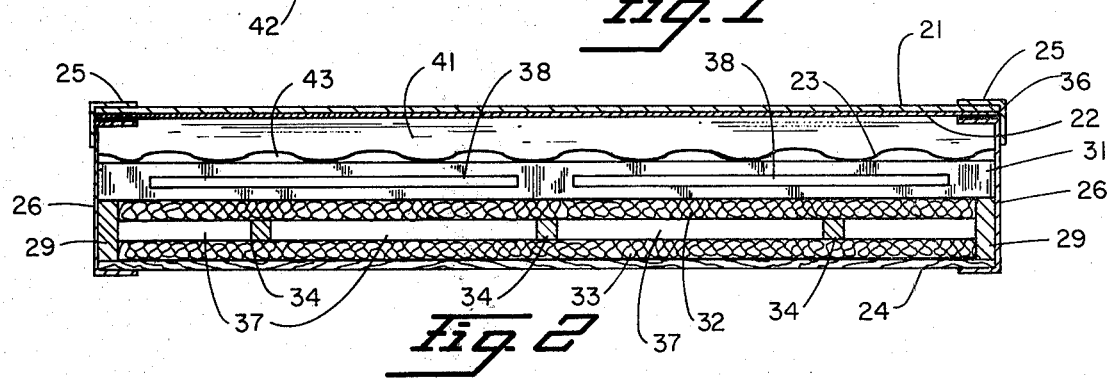
FIG. 2 is a cross sectional elevation view of the solar heat collector of FIG. 1.

As shown by FIG. 2, the wall 26 has an upper flange and a lower flange extending perpendicularly from its top and bottom edges toward the interior of the box. The solar panel 21 and screen 22 are positioned on top of the upper flange 36 of each of the walls 26 and is secured thereto by an "L" shaped bracket 25 as shown in FIGS. 2, 3, 7 and 11. The "L" shaped bracket is attached to the solar panel 21 and to the wall 26 by rivets or other attachment means well known in the art. An air gap 41 immediately below the screen 22 is isolated from air outside the box by a sealing means 36 between the screen 22 and the upper flange of the wall 26; see FIG. 7.

Figure 3:
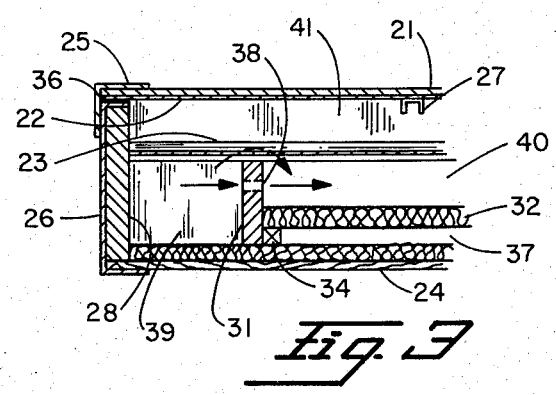
FIG. 3 is another cross sectional elevation view of the solar heat collector of FIG. 1.
Figure 7:
FIG. 7 is a detail cross sectional elevation view of a solar heat collector.
Figure 11:
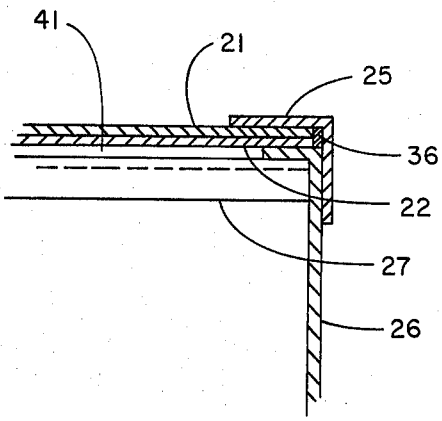
FIG. 11 is a detail cross sectional elevation view of a solar heat collector.

An alternate means of isolating the air gap 41 from the air outside the box is shown in FIG. 11. In the alternate method, the sealing means is placed on the interior corner of the "L" shaped bracket 25 and abutts the peripheral edge of the solar panel 21, the screen 22 and the wall 26. As shown in FIGS. 1 and 3, a plurality of elongated "U" shaped support members 27 positioned immediately below the screen 22 provide support for the screen 22 and the solar panel 21. The elongated "U" shaped members 27 are in parallel alignment with the end faces of the box and are spaced evenly along the length of the solar panel 21 and screen 22. The ends of the elongated "U" shaped members are attached to the upper flange of the wall 26 by rivets or other attachment means well known in the art.

An energy absorbing panel 23 is positioned one to two inches below the screen 22 as indicated in FIGS. 2, 3 and 6. The panel 23 extends to the four walls 26 and is supported by a plurality of elongated slotted support members 31. The elongated slotted support members are in parallel alignment with the ends of the box as shown by FIG. 6. Each end of the elongated slotted support member 31 extends to a wall 26. Each end of the elongated slotted support members 31 rests on an elongated side support member 29. The elongated side support member 29, as shown by FIG. 2, is positioned against the wall 26 at each side of the box and abutts the lower rigid panel 26 of the box. The elongated slotted support members 31 and elongated side support members 29 are attached to the side walls and to each other by attachment means also well known to persons skilled in the art. The elongated slotted support members 31 also rest upon a sheet of insulation 33 extending to the four walls 26 as shown by FIGS. 2 and 3. It can be seen from FIGS. 2 and 6 that a rigid lower panel 24 is positioned immediately below the sheet of insulation 33 and forms the lower exterior surface of the box. The sheet of insulation 33 is attached to the lower face 24 by glue or other conventional means. FIGS. 2 and 3 show that an upper layer of insulation 32 has been positioned a small distance above said lower sheet of insulation 33 and between the elongated slotted support members 31, thereby forming an insulating air gap 37. It can also be seen from FIGS. 2 and 3 that the upper layer of insulation 32 is supported by a plurality of block-shaped support pieces 34 positioned at regular intervals between said insulation layers 32, 33 and held in position by glue or other attachment means well known in the art.

It can also be seen from FIGS. 2 and 3 that an air gap, hereinafter referred to as a heating air gap 40, has been formed between the collector panel 23 and the upper layer of insulation 32. The heating air gap 40 is divided into sections by the elongated slotted support members 31, however, air communicates between the sections of the heating air gap 40 through the space 43 between the corrugated absorber panel 23 and the elongated slotted support members 31. Two elongated slots 38 in each elongated slotted support member 31 also allow air to communicate between sections of the heating air gap 40.

It may be seen from the FIG. 3 that a cavity, hereinafter referred to as a plenum chamber 39, is provided parallel to each end of the box. The plenum chambers 39 have a rectangular cross section formed by the elongated end support member 28, the lower insulation layer 33, an elongated slotted support member 31, and the corrugated absorber panel 23.

The solar heat collecting apparatus described above produces a warm air flow that may be used for heating purposes by converting solar radiation into heating energy. The solar panel 21 allows high frequency solar radiation to pass through its light admitting surface when the panel 21 is directed toward the sun. Although any light admitting surface may be used, a transparent plastic panel has been used in the preferred embodiment. The plastic panel is lighter weight and is less likely to be damaged by surface impacts, from hail or other objects, than a plate of glass.

The solar radiation passing through the solar panel and striking the corrugated heat absorber 23 is both reflected and absorbed by the absorber 23. The absorbed solar radiation is converted into long wave length heat radiation by the absorber 23 and is in turn radiated into the air on either side of the absorber 23. The corrugated shape of the absorber 23 increases its efficiency by providing a greater surface area for solar radiational absorption than a flat plate.

Figure 12:
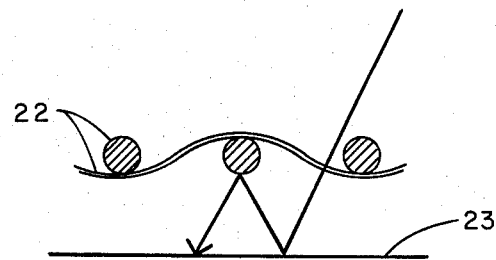
FIG. 12 is a schematic detail cross section of a solar heat collector screen and absorber.
Figure 13:
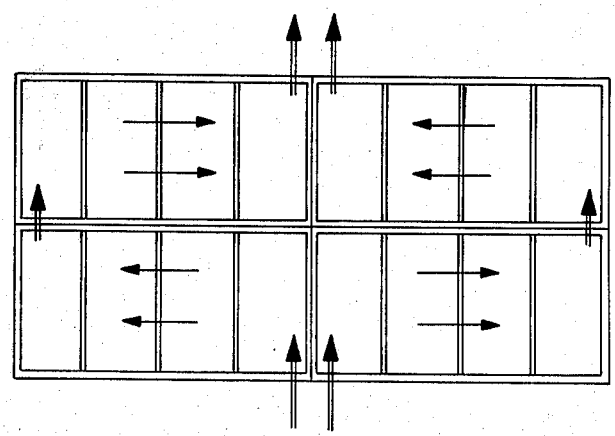
FIG. 13 is a plan view of interconnected solar heat collectors showing air flow direction.

In conventional heat collectors a great deal of potential heating energy is lost through the solar panel 21. Although the solar panel reflects some of the heat radiation, nearly all of the short wave length radition that is reflected by the absorber 23 passes back out through the solar panel 21. The present invention greatly improves the efficiency of the solar heat collecting apparatus by the addition of a small gauge, wire mesh screen 22 between the solar panel 21 and the absorber 23. The screen 22 has a radiation absorptive upper surface and a reflective lower surface. For the incoming solar radiation striking the wire mesh the screen acts as a first stage absorber transforming the light into heat radiation. However, the primary function of the screen, as shown by FIG. 12, is to prevent the escape of radiation coming off the surface of the absorber 23. As shown by the arrow in FIG. 12, radiation reflected from the absorber 23 strikes the screen 22 at oblique angles and is redirected toward the surface of the absorber 23 where it may again be absorbed or reflected. The reflective action of the screen is enhanced with radiation of longer wave lengths which is less likely to pass through the small holes in the screen.

Although the preferred embodiment shown in the drawings represents a solar collector which uses forced air as a heating means, the use of a screen 22 as discussed above represents an improvement which may be used in any solar collector which employs a light admitting solar panel and a heat absorbing collector plate. The use of a screen in such manner as described above in any solar heat collection apparatus is therefore well within the scope of the invention.

In the preferred embodiment air is forced through an opening 42 located in one of the plenum chambers 39 of the heating apparatus. The air then passes through air passages 38 and 43 in FIG. 2 as well as through the heating air gap 40 beneath the absorber 23. The air which has been heated by heat radiation from the absorber then passes into the other plenum chamber 39 and out an opening 42 in the plenum chamber 39. Heat loss through the lower panel 24 of the solar heating apparatus is prevented by the upper and lower insulation layers 32, 33 and by the insulating air gap 37.

In the preferred embodiments shown in FIGS. 4, 5, 6, 8 and 9 air is forced by a fan 51 through an air duct 50 into the solar heating apparatus and the heated air is then passed out of the apparatus through another air duct 50 and into the area to be heated. A thermostat, (not shown) which is sensitive to the air temperature within the apparatus and to the air temperature within the room, controls the operation of the fan 51. For maximum effectiveness, the heat collection apparatus is inclined so that the rays of the sun may enter the solar panel at a direct angle as illustrated in FIGS. 5 and 10.

As shown by FIG. 5, the apparatus may be mounted on a support structure 53 and outside air may be used for heating. FIG. 10 illustrates that inside air may be heated and recirculated by the apparatus which in this drawing is mounted on an outside window 53.

The solar heating apparatus as shown by the drawings is designed for modular use. An opening 42 may be positioned at any area on the wall 26 or lower panel 24 which surrounds the plenum chamber 39 to form the air intake opening, and the air exhaust opening may be positioned with equal freedom in the plenum chamber 39 at the other end of the apparatus. The use of plenum chambers 39 with multiple positions for openings allows the solar heat collecting apparatus to be used in various combinations and alignments as shown by FIGS. 4, 8, 9 and 13. The adaptation of plenum chambers to allow a solar heat collecting apparatus to be used in modular combinations has broad application in the use of any solar heat collecting apparatus and well within the scope of the claimed invention.

Although specific components, proportions and process steps have been stated in the above description of the preferred embodiments of the invention, other suitable materials, proportions and process steps, as listed herein, may be used with satisfactory results in varying degrees of quality. In addition, it will be understood that various other changes of the details, materials, steps, arrangements of parts, and uses which have been herein described and illustrated in order to explain the nature of the invention will occur to and may be made by those skilled in the art, upon a reading of this disclosure, and such changes are intended to be included within the principles and scope of this invention.

We claim:

1. An improved solar heat collector of the type having a light admitting layer and an energy absorbing layer wherein the improvement comprises a wire mesh screen positioned between said light admitting layer and said energy absorbing layer, said screen having a light reflecting lower surface proximal said energy absorbing layer and an upper darkened light absorbing surface, and an air flow means directed over at least one surface of said energy absorbing layer.

2. The improved solar heat collector as described in claim 1, said collector having a first end and a second end wherein said first end further comprises an air inlet plenum in fluid communication with said air flow means.

3. The improved solar heat collector as described in claim 2, wherein said second end further comprises an air outlet plenum in fluid communication with said air flow means.

4. The improved solar heat collector as described in claim 3, further comprising a plurality of slotted support means for supporting said plate.

5. The improved solar heat collector as described in claim 1, wherein said light admitting layer is comprised of a plastic material.

* * * * *